United States Patent Office 3,732,319
Patented May 8, 1973

3,732,319
FORMATION OF T-BUTYL ETHER FROM METHYLAL
John O. Turner, West Chester, Pa., assignor to Sun Oil Company, Philadelphia, Pa.
No Drawing. Filed Sept. 4, 1970, Ser. No. 69,966
Int. Cl. C07c 43/04
U.S. Cl. 260—614 R                             1 Claim

ABSTRACT OF THE DISCLOSURE

Compounds such as dimethoxymethane, diethoxymethane or diisopropoxymethane may be converted to the corresponding t-butyl ether by reacting the same with t-butyl alcohol in the presence of an acidic catalyst such as sulfuric acid or certain acidic ion exchange resins or mole sieves.

BACKGROUND OF THE INVENTION

This invention relates to a novel method for producing t-butyl ethers. More particularly, this invention relates to a process for reacting dimethoxymethane ("methylal"), diethoxymethane or diisopropoxymethane with t-butyl alcohol in the presence of an acidic catalyst to form the corresponding t-butyl ether.

U.S. Patent 2,605,287 teaches the hydrolysis of methylal in the presence of selected catalysts such as charcoal, phosphoric acid-treated charcoal or the like, in which small amounts of methanol (up to about 8 percent) may be mixed in with the methylal feedstock. The products, in this case, are methanol and formaldehyde. The formation of ethers is neither taught nor suggested by this reference.

SUMMARY OF THE INVENTION

It has now been found, in accordance with the present invention, that when dimethoxymethane, diethoxymethane or diisopropoxymethane is reacted with t-butyl alcohol in the presence of an acidic catalyst there is obtained the corresponding t-butyl ether.

DESCRIPTION OF THE INVENTION

This process may be conveniently carried out by simply adding a selected acidic catalyst to a mixture of the dialkoxymethane and t-butyl alcohol and heating the mixture for a period of from 2 to 8 hours at a temperature of about 60 to 150° C., and preferably at 80 to 120° C., at either atmospheric or autogenous pressure. The mole ratio of dialkoxymethane to t-butyl alcohol should be 0.5 to 1.

The acidic catalysts found to be effective in the operation of this process include both solid and liquid materials. Thus, for example, amongst the solid catalysts which may be employed are such compounds as silica-alumina, phosphoric acid on kieselguhr, phosphoric acid on charcoal, hydrogen-exchanged mole sieves, as for example hydrogen-exchanged Zeolon, or acidic ion-exchange resins. Included amongst the latter materials are chiefly sulfonic acid-type resins having a polystyrene-divinylbenzene matrix such as Amberlyst 15, Amberlite 120 or 122 (Rohm and Haas, Phila., Pa.) or Dowex 50 (Dow Chemical Co., Midland, Mich.). Other resins or inorganic solids like those enumerated above which have an equivalent acid strength may likewise be employed. The amount of solid catalyst employed may vary from 5 to 75 weight percent based on the total weight of alcohol and alkoxymethane.

Mineral acids such as $H_2SO_4$ or $H_3PO_4$ may also be employed as catalysts in this invention in the form of aqueous solutions with concentrations ranging from 10 to 35 percent. The quantity of aqueous acid of the above concentration should be in range of from 1 to 100 percent of the weight of dialkoxymethane, although 20 to 50 weight percent is preferred.

When the aforesaid dialkoxymethanes are reacted with t-butyl alcohol in accordance with the process described above, there are obtained the corresponding t-butyl ethers, namely methyl t-butyl ether, ethyl t-butyl ether and isopropyl t-butyl ether, together with lesser amounts of amounts of formaldehyde and lower alkanol, i.e. methyl, ethyl or isopropyl alcohol. However, when larger amounts of t-butyl alcohol are used, i.e. two or more moles of alcohol per mole of dialkoxymethane, proportionately larger amounts of ether and water are obtained to the exclusion of the lower alkanol, together with water and formaldehyde in the form of an aqueous solution of said formaldehyde.

The resulting ethers may readily be separated from the aforedescribed reaction mixture by filtration when solid acids are employed and by direct distillation, preferably at reduced pressures, when the aqueous mineral acids are employed. Although, in the case of the aqueous mineral acids, neutralization, followed by phase separation, may be used.

The following examples are given to illustrate the process of this invention:

Example 1

In a closed system comprising a pressure vessel equipped with a magnetic stirrer, 0.1 mole of methylal and 0.1 mole of t-butyl alcohol are heated at 90° C. for 4 hours over 4 gms. of Amberlyst 15 resin to give 0.7 mole of methyl t-butyl ether (70 percent yield).

Example 2

In a closed system as defined in Example 1, 0.5 mole of methylal and 0.1 mole of t-butyl alcohol are heated for 4 hours at 90° C. over 4 gms. of Amberlyst 15 resin to give 0.065 mole of methyl t-butyl ether (65 percent yield).

Example 3

In accordance with the procedure of Example 1, but heating the reaction mixture to a temperature of 115° C., there is obtained 0.8 mole of methyl t-butyl ether (80 percent yield).

Example 4

In accordance with the procedures of Example 1, but substituting 4 gms. of 25 percent sulfuric acid for the Amberlyst 15 resin, there is obtained 0.05 mole of methyl t-butyl ether (50 percent yield).

Example 5

In accordance with the procedures of Example 1, but substituting 2 gms. of phosphoric acid-treated charcoal for the Amberlyst 15 resin, and heating the mixture to a temperature of 120° C., there is obtained 0.04 mole of methyl t-butyl ether (40 percent yield).

Example 6

In accordance with the procedures of Example 1, but substituting 3 gms. of 50 percent aqueous phosphoric acid for the Amberlyst 15 resin, there is obtained 0.035 mole of methyl t-butyl ether (35 percent yield).

Example 7

In accordance with the procedures of Example 1, but substituting diethyoxyethane for methylal, there is obtained 0.025 mole of ethyl t-butyl ether (25 percent yield).

Example 8

In accordance with the procedures of Example 1, but substituting diisopropoxymethane for methylal, there is obtained 0.02 mole of isopropyl t-butyl ether (20 percent yield).

What is claimed is:

1. A process for the production of lower alkyl t-butyl ethers which comprises reacting at a temperature of from 60 to 150° C. a dialkoxymethane selected from the group consisting of dimethoxymethane, diethoxymethane and diisopropoxymethane with t-butyl alcohol in the presence of an acidic catalyst selected from the group consisting of mineral acids selected from the group consisting of sulfuric and phosphoric acids, and solid catalysts selected from the group consisting of silica-alumina, phosphoric acid on kieselguhr, phosphoric acid on charcoal, hydrogen-exchanged mole sieves, and sulfonic acid-type exchange resins, to form the corresponding lower alkyl t-butyl ether, wherein the amount of acid catalyst is from 1 to 100 percent based on the weight of the dialkoxymethane when the catalyst is a mineral acid, and from 5 to 75 weight percent based on the total weight of the dialkyoxymethane and alcohol when the catalyst is a solid catalyst, and wherein the mole ratio of dialkyoxymethane to t-butyl alcohol is in the range of from 0.5 to 1.0.

References Cited

UNITED STATES PATENTS

| | | | |
|---|---|---|---|
| 3,170,000 | 2/1965 | Verdol | 260—614 A X |
| 3,121,124 | 2/1964 | Verdol | 260—614 A X |
| 1,968,601 | 7/1934 | Edlund et al. | 260—614 A |
| 3,135,807 | 6/1964 | Grasselli et al. | 260—614 A |

OTHER REFERENCES

Fieser et al.: Organic Chemistry, D.C. Health and Co., Boston, 1944, pp. 54–58, 221.

HOWARD T. MARS, Primary Examiner

U.S. Cl. X.R.

260—606, 642